United States Patent [19]

Aron

[11] 3,855,165

[45] Dec. 17, 1974

[54] NOVEL PROCESSING AIDS FOR RUBBER COMPOUNDS

[76] Inventor: Erwin Aron, 106 Railroad Ave., Clifton, N.J. 07509

[22] Filed: Sept. 20, 1973

[21] Appl. No.: 399,357

Related U.S. Application Data

[63] Continuation-in-part of Ser. No. 128,549, March 26, 1971, abandoned.

[52] U.S. Cl. . 260/23.7 M, 260/31.4 R, 260/33.4 R, 260/33.6 UA, 260/752
[51] Int. Cl............................ C08c 11/72, C08d 9/14
[58] Field of Search ......... 260/752, 23.7 M, 31.4 R, 260/33.4 R, 33.6 UA

[56] References Cited
UNITED STATES PATENTS 3,437,621   4/1969   Aron.................................. 260/752

3,787,341   1/1974   Aron............................ 260/23.7 M

OTHER PUBLICATIONS

Buttrey, "Plasticisers," 1960, Copy in Group, pp. 20–26.

Primary Examiner—Melvyn I. Marquis
Assistant Examiner—William E. Parker
Attorney, Agent, or Firm—Kenyon & Kenyon Reilly Carr & Chapin

[57] ABSTRACT

Compositions comprising aromatic esters, compounds with alcoholic and glycolic hydroxyl groups, potassium or sodium soaps of fats or fatty acids, a fatty acid, a zinc, magnesium, calcium or barium soap, and a paraffin aid in the mixing of rubber compounds, permitting shorter mixing time and more flexible timing of the admixture of compounding ingredients.

15 Claims, No Drawings

NOVEL PROCESSING AIDS FOR RUBBER COMPOUNDS

BACKGROUND OF THE INVENTION

Until comparatively recent times all rubber compounds were mixed by first masticating or breaking down the polymer by itself before mixing in the other compounding ingredients. Lately, the "upside-down" mixing technique has been introduced for certain elastomers, e.g., ethylene-propylene diene modified rubbers (EPDM). In this type of processing, or modifications thereof, all or most of the ingredients of the rubber compound are introduced into a mixer such as the Banbury at the start or early in the mixing cycle.

With the use of the novel processing aids of this invention, the customary preliminary mastication or breakdown of the natural or synthetic rubber is not required or else it is so facilitated that Banbury mixing cycles are reduced by about 25 to 50 percent. In either event, the total time required for compounding the rubber is substantially reduced.

In addition to the savings in time, the processing aids of this invention so reduce the viscosity of the rubber compound that the desired degree of mixing is achieved with much less power input and mechanical generation of heat in the rubber compound. Thus, the processing aids afford still further economies. Moreover, because the rubber is not heated to as high a temperature during mixing, there is less danger of loss of or harm to a batch due to scorching, premature curing, etc., which may otherwise occur.

Furthermore, dispersions of the rubber compound using small amounts of these processing aids frequently are better than dispersions using longer mixing times without the use of these processing aids. The use of these processing aids has numerous other beneficial effects in rubber compounding, for example, they provide for improved flow, physicals, mixing and extruding characteristics and permit the full utilization of the capacity of the Banbury mixer.

It is, therefore, the primary object of this invention to provide novel rubber processing compositions which facilitate the mixing of rubber compounds with natural and synthetic rubbers in relation to time requirements, arrangement of schedules for the addition of various compounding ingredients, and the possibility of uninterrupted working with the mixed compound because of lower, safer dump temperatures without adversely affecting physical properties of said rubber compounds.

SUMMARY OF THE INVENTION

This invention relates to novel processing aids for rubber compounds and more particularly it relates to novel compositions which provide for improving the mixing time, mixing timing, and lowering of mixing temperatures, of rubber compounds, and to rubber compounds containing these compositions.

The novel compositions of this invention comprise:
a. From about 5 percent to about 15 percent of aromatic esters selected from groups consisting of (1) di-aryl-and di-arylalkyl phthalates, (2) di-aryl- and arylalkyl mono-glycolether phthalates, (3) phthalates from polyglycol mono-ethers of aryl and arylalkyl compounds wherein the polyglycol chain contains from 2 to 6 ethylene oxide groups in the chain, (4) di-benzoates of glycol and propyleneglycol, and their di-and trimers; and (5) mixtures of the above.
b. From about 5 percent to about 30 percent of compounds with alcoholic or glycolic hydroxyl groups selected from (1) straight or branched chain aliphatic alcohols having from about 8 to 20 carbons in the chain; (2) alkylphenoxy ethers of glycols or polyglycols wherein the alkyl group is limited to about 12 carbons in the chain, and the polyglycol grouping does not contain more than about 6 ($CH_2$—$CH_2$—O—) groups; (3) polypropylene glycol of about three propylene oxide groups in the molecule; and (4) mixtures of the above.
c. From about 5 percent to about 15 percent of potassium or sodium soaps made from commercial mixtures of fats or fatty acids containing from about 12 to about 18 carbon atoms in the chain, said chains having only a small degree of unsaturation, with more than 50 percent of them having 18 carbon atoms in the chain.
d. From about 10 percent to about 30 percent of fatty acids having from about 12 to about 18 carbon atoms in the chain, said chains having only a small degree of unsaturation, with more than 50 percent of them having 18 carbon atoms in the chain.
e. From about 5 percent to about 10 percent of a metal soap where the metal is selected from the group consisting of zinc, magnesium, calcium, or barium, and the fatty acid part of the soap has from about 12 to 18 carbon atoms in the chain and contains a high percentage of chains with a single double bond in the chain.
f. From about 15 percent to about 60 percent of hydrocarbons selected from the group consisting of mineral oil, mineral waxes, and petrolatum, or mixtures of them.

Preferably the potassium or sodium soaps of (c) above or the fatty acids of (d) above are compounds which have iodine values in the range of about 5 to about 15. The metal soaps of (e) above are more unsaturated and have iodine values in the range of about 80 to about 95.

Typical aromatic esters of (a) above which may be used in the compositions of this invention are dibenzyl phthalate, diphenyl phthalate, di-(2-phenoxylethyl) phthalate; di(nonylphenoxyethyl) phthalate, di(nonylphenoxytetraethyleneglycol) phthalate, benzyldodecylphenoxy hexaethyleneglycol phthalate, di(octylphenoxyhexaethyleneglycol) phthalate, diethyleneglycol dibenzoate, dipropyleneglycol dibenzoate, triethyleneglycol dibenzoate.

Illustrative of the compounds with alcoholic or glycolic hydroxyl groups referred to in (b) above which may be employed are 2-ethylhexanol, cetyl alcohol, stearyl alcohol, nonylphenoxyglycol, nonylphenoxydiglycol, nonylphenoxytetraethyleneglycol, dodecylhexaethyleneglycol, dipropyleneglycol, tripropyleneglycol.

Among the potassium or sodium soaps referred to in (c) above are sodium and potassium soaps of hydrogenated tallow, hydrogenated oils of vegetable or marine origin, and soaps of potassium or sodium made with fractions prepared from oils and fats, such fractions having iodine values from about 5 to about 15.

Typical fatty acids which may be employed are those derived from hydrogenated tallow or hydrogenated oils of vegetable or marine origin.

Illustrative of the fatty acid part of the metal soaps referred to in (e) above are oils of vegetable origin or fractions of animal fatty acids such as red oil. The preferred fatty acid is technical grade oleic acid.

Among the petroleum jellies, mineral oils, and mineral waxes which may be employed in the compositions of this invention, are waxes having melting points of about 120° to 170°F. and the petrolatums are those preferably of petroleum origin having melting points of about 100° to 135°F.

The novel rubber processing compositions of this invention can be made by heating the above ingredients together until a clear melt is obtained. The alkali soaps and soaps of the bivalent metals can also be made in situ, as is well known in the art, from the oxide, hydroxide or carbonate of the metal and the desired acids or acid anhydrides followed by the evaporation or boiling off of the resulting water.

Preferably the novel compositions of this invention are made by placing the metal soaps and the hydrocarbon in a suitable kettle and heating to approximately 110°C. and thoroughly agitating until the soap is well dispersed. The fatty acid is then admixed, while raising the temperature by about 10°C., if necessary, to facilitate the mixing. Next, the potash or soda soaps are gradually admixed, followed by the hydroxy materials. The mass is then mixed until essentially clear or homogeneous. The aromatic compounds are then thoroughly admixed. The material is then ready to be filled into suitable containers and allowed to solidify.

The compositions of the present invention are generally added to the rubber at the beginning of the compounding stage. In ordinary rubber compounding raw rubber is first masticated to make it more pliable and then it is admixed with other compounding ingredients such as pigment, i.e., carbon black; filler, e.g., oxides of zinc, magnesium, lead, or calcium, vulcanizing agents, e.g., sulphur, etc. Now these ingredients can generally be added to the raw rubber after the rubber has been mixed for a short time with the compositions of this invention.

The compositions of this invention are employed in small but effective amounts and generally in the range of about 0.5 to 3 percent and preferably in the range of 1 to 2 percent based on the total weight of the rubber item as employed. The composition of this invention may be added to any type rubber whether it be natural, synthetic or of the reclaimed type.

The compositions of this invention are similar to the mill release agents of my earlier U.S. Pat. No. 3,437,621 issued Apr. 8, 1969. That is, the patented mill release agents and the processing aids of this invention have many components in common. They are not identical, however, and it has been found necessary to vary the components of the mill release compositions and their proportions to adapt the mill release agents for use in accordance with this invention.

The most important modification is the inclusion of the aromatic esters of class (a) above. Without limiting the invention as to theory, it is believed that the aromatic ester acts as a co-solvent for the other components of the processing aids of this invention and for the rubber, thereby facilitating intimate mixing of the processing aid with the rubber. Regardless of theory, it has been found that the aromatic ester is an essential component of the processing aid, and, further, that unless the composition of this invention is formed prior to mixing with rubber it will not afford the results desired by applicant. That is, when the preformed composition of this invention is mixed with rubber, results are achieved which are superior to those achieved when the aromatic ester (a) and the remaining components (b), (c), (d), (e) and (f) are added separately. It is further believed that the processing aids of this invention are useful in reducing mixing time, etc. because they facilitate dispersion of the various compounding ingredients in rubber before they can be absorbed by fillers, etc., which are employed during compounding.

Dialkyl phthalates, such as dibutyl or dioctyl phthalate, are known as plasticizers for rubber. However, to the best of my knowledge, the aromatic esters of (a) have not been employed for this purpose. In any event, the aromatic esters employed in accordance with this invention are not intended to be employed as plasticizers and, indeed, are not employed as such. Plasticizers are incorporated into rubber to impart flexibility to the cured rubber and for such use they normally are employed in amounts exceeding about 5 parts per 100 parts rubber. In contrast, the compositions of this invention are employed to soften the uncured rubber so that it is more fluid and easily mixed with the other rubber compounding ingredients. Further, the compositions of this invention ordinarily are employed at amounts not exceeding 3 per cent of the total weight of the rubber compound, or at levels below those commonly employed with conventional plasticizers.

The following formulations prepared according to the above procedure illustrate the novel compositions of this invention. The listed ingredients may be technical grade and may contain varying amounts of related materials, by-products, etc.

COMPOSITION A 10.0 kg dipropyleneglycol di-benzoate
15.0 kg nonylphenoxytetraethyleneglycol
8.0 kg tripropylene glycol
6.0 kg potassium soap of hydrogenated tallow
17.0 kg stearic acid, rubber grade
10.0 kg zinc oleate
34.0 kg petrolatum

COMPOSITION B 5.0 kg dinonylphenoxy glycol phthalate and dinonylphenoxydiglycol phthalate (Approx. 50—50 mixture) (As technically produced).
10.0 kg cetyl alcohol
10.0 kg nonylphenoxyglycol and nonylphenoxydiglycol (Approx. 50-50 mixture) (As technically produced).
10.0 kg dodecylphenoxy hexaethyleneglycol
15.0 kg sodium stearate
10.0 kg stearic acid, rubber grade
10.0 kg calcium oleate
20.0 kg paraffinic mineral oil 100/100
10.0 kg paraffin wax, refined

COMPOSITION C 15.0 kg benzyl-dodecylphenoxy hexaethyleneglycol phthalate
5.0 kg 2-ethylhexanol
10.0 kg cetyl alcohol
5.0 kg dodecylphenoxy hexaethyleneglycol
10.0 kg nonylphenoxy tetraethyleneglycol
10.0 kg potassium stearate 20.0 kg stearic acid
5.0 kg barium oleate
5.0 kg magnesium oleate
15.0 kg petrolatum

COMPOSITION D 7.0 kg diphenyl phthalate
8.0 kg dipropyleneglycol di-benzoate
3.0 kg cetyl alcohol
10.0 kg tripropylene glycol
13.0 kg potassium stearate
30.0 kg stearic acid
5.0 kg zinc oleate
24.0 kg petrolatum

COMPOSITION E 9.0 kg diphenyl phthalate
5.0 kg cetyl alcohol
5.0 kg potassium stearate
19.0 kg stearic acid
8.0 kg zinc stearate
55.0 kg petrolatum

COMPOSITION F 10.0 kg diphenyl phthalate
3.5 kg cetyl alcohol
14.0 kg nonylphenoxytetraethyleneglycol
7.0 kg tripropylene glycol
5.0 kg potassium soap of hydrogenated tallow
15.0 kg stearic acid
10.0 kg zinc oleate
35.5 kg petrolatum Each of the above compositions made in accordance with this invention were used as additives at about 1 to 2 percent levels in various rubber formulations including natural and synthetic rubbers. Results of these tests are set forth in the examples below and show the effectiveness of the processing aids of this composition in EPDM rubber composition.

EXAMPLE NO. 1

Basic EPDM Rubber Composition 100 parts EPDM Rubber (Nordel 1145)
5 parts zinc oxide
1 parts stearic acid
180 parts FEF Carbon Black
90 parts process oil (Sunpar 150)
2 parts mercaptobenzthiazole
1.5 parts tetramethylthiuram monosulfide
1.5 parts sulfur All ingredients were placed in the Banbury mixer at 0 minutes. After 6 minutes mixing the temperature levelled at 255°F., Mooney Viscosity ML-4 at 212°F. was 110, tensile strength 1670, elongation 260 percent.

The above composition does not employ the additives of this invention and required six minutes in a Banbury mixer before good dispersion of the ingredients was obtained.

EXAMPLE NO. 2

To the basic formula of Example No. 1 were added 3.75 parts of Compound A (described above). The 3.75 parts of Compound A and the 100 parts of EPDM rubber were placed in the Banbury at 0 minutes. At 15 seconds all other ingredients except curatives were added. After 4 minutes the temperature levelled at 240°F., Mooney Viscosity ML-4 at 212°F. was 71, tensile 1770, elongation 250 percent.

EXAMPLE NO. 3.

To the basic formula of Example No. 1 were added 7.5 parts of Compound A (described above). The 7.5 parts of Compound A and the 100 parts of the EPDM rubber were placed in the Banbury at 0 minutes. At 15 seconds all other ingredients except curatives were added. After 4 minutes the temperature levelled at 240°F., Mooney Viscosity ML-4 at 212°F. was 72, tensile 1580, elongation 260 percent.

EXAMPLE NO. 4

To the basic formula of Example No. 1 were added 7.5 parts of Compound B (described above). The 7.5 parts of Compound B and 100 parts of EPDM rubber were placed in the Banbury at 0 minutes. At 15 seconds all other ingredients except curatives were added. After 5 minutes the temperature levelled at 250°F., Mooney Viscosity ML-4 at 212°F. was 74, tensile 1690, elongation 290 percent.

EXAMPLE NO. 5

To the basic formula of Example No. 1 were added 7.5 parts of Compound C (described above).

The 7.5 parts of Compound C and 100 parts of EPDM rubber were placed in the Banbury at 0 minutes. At 15 seconds all other ingredients except curatives were added. After 5 minutes the temperature levelled at 230°F., the Mooney Viscosity ML-4 at 212°F. was 71, tensile 1660, elongation 230 percent.

EXAMPLE NO. 6

To the basic formula of Example No. 1 were added 7.5 parts of Compound D (described above).

The 7.5 parts of Compound D and 100 parts of EPDM rubber were placed in the Banbury at 0 minutes. At 15 seconds all the other ingredients except curatives were added. After 5 minutes the temperature levelled at 250°F., Mooney Viscosity ML-4 at 212°F. was 73, tensile 1660, elongation 250 percent.

EXAMPLE NO. 7

To the basic formula of Example No. 1 were added 7.5 parts of Compound E (described above). The 7.5 parts of Compound E and 100 parts of EPDM rubber were placed in the Banbury at 0 minutes. At 15 seconds all other ingredients except curatives were added. After 5 minutes the temperature was levelled at 240°F., Mooney Viscosity ML-4 at 212°F. was 72, tensile 1560, elongation 280 percent.

EXAMPLE NO. 8

To the basic formula of Example No. 1 were added 7.5 parts of Compound F (described above). The 7.5 parts of Compound F and 100 parts of EPDM rubber were placed in the Banbury at 0 minutes. At 15 seconds all other ingredients except curatives were added. After 5 minutes the temperature levelled at 230°F., Mooney Viscosity ML-4 at 212°F. was 73, tensile 1740, elongation 310 percent.

In all of the above examples the composition was cured for 20 minutes at 320°F. for testing of tensile strength and ultimate elongation (ASTM D 412).

The data from Examples 1–8 can be summarized as follows:

TABLE I

| Example | Processing Aid | pts. | Mooney Viscosity | Mixing Time | Mixing Temp.°F. | Tensile Str. | Elongation |
|---|---|---|---|---|---|---|---|
| 1 | None | — | 110 | 6 | 255 | 1670 | 260 |
| 2 | A | 3.75 | 71 | 4 | 240 | 1770 | 250 |
| 3 | A | 7.5 | 72 | 4 | 240 | 1580 | 260 |
| 4 | B | 7.5 | 74 | 5 | 250 | 1690 | 290 |
| 5 | C | 7.5 | 71 | 5 | 230 | 1660 | 230 |
| 6 | D | 7.5 | 73 | 5 | 250 | 1660 | 250 |
| 7 | E | 7.5 | 72 | 5 | 240 | 1560 | 280 |
| 8 | F | 7.5 | 73 | 5 | 230 | 1740 | 310 |

As is evident, all of the processing aids substantially reduced the Mooney Viscosity of the rubber compound, which facilitated mixing of the compound ingredients. Because of the reduced viscosity, the power required to effect mixing is substantially reduced. As further evidence of the increased ease of mixing, it can be seen that the time to achieve mixing was reduced by from 1 to 2 minutes and the temperature of the mixture was lower due to less mechanical generation of heat when the processing aids of this invention were employed. Although the processing aids substantially reduced Mooney Viscosity, they had little significant effect on the physical properties (i.e., tensile strength and elongation) of the cured rubber. If conventional rubber plasticizers were employed to reduce the Mooney Viscosity to 70–75, they also would have a substantial adverse effect on the tensile strength and elongation of the cured rubber.

The following examples illustrate the use of the compositions of this invention when added to neoprene rubber composition

EXAMPLE NO. 9

Basic Neoprene Formulation 100 parts Neoprene WHV
5 parts zinc oxide
2 parts light magnesium oxide
0.5 parts stearic acid
170 parts medium thermal carbon black
26 parts process oil (mineral)
1 parts diorthotolyl guanidine
1 parts tetramethylthiuram monosulfide
1 parts sulfur This oil resistant hose compound was mixed in a Banbury, placing all ingredients except the diorthotolyl guanidine, tetramethylthiuram monosulfide, and sulfur in mixer at 0 minutes. At 9 minutes the temperature levelled at 320°F. Visual examination of the compound under magnification showed satisfactory dispersion of the ingredients. Through repetitions of the mixing of the above compound the 9 minute mixing time was established as necessary for satisfactory results.

EXAMPLE NO. 10

100 parts Neoprene WHV
3 parts Compound B (described above)
5 parts zinc oxide
2 parts light magnesium oxide
0.5 parts stearic acid
170 parts medium thermal carbon black
26 parts process oil (mineral)
1 parts diorthotolyl guanidine
1 parts tetramethylthiuram monosulfide
1 parts sulfur This oil resistant hose compound with about 1 percent Compound B (described above) was mixed in a Banbury by placing the neoprene WHV, Compound B, and 10 parts of the MT carbon in the mixer at 0 minutes, at 15 seconds all other ingredients except the curatives were added. At 6 minutes the temperature levelled at 300°F. Visual examination of the compound under magnification showed dispersion of ingredients equal to that of Example No. 9. Repetitions of the above test gave essentially the same results.

EXAMPLE NO. 11

In regular commercial manufacturing a styrene butadiene rubber compound using 70 durometer material was run. The Banbury mixing required a 3½ minute cycle, dump temperature was 280°F. When 1 percent of Compound F (described above) was added to the above commerical SBR Compound the mixing time could be shortened to 2½ minutes, the dump temperature was 250°F.

It will be noted that in Examples No. 10 and 11 the novel compositions of this invention not only reduced the mixing time but also permitted the use of lower dump temperatures. In actual continuing production runs of a rubber compound based on natural rubber, excellent results were obtained when the novel processing aids of this invention were introduced into the formula. Original Compound:

100 parts smoked sheet
1 parts peptizer (sulfonic acid)
5 parts zinc oxide
1 parts stearic acid
1 parts phenylbetanaphytlamine
20 parts FEF carbon black
40 parts SRF carbon black
10 parts process oil
2 parts sulfur
1 parts dibenzthiazyl disulfide
0.2 parts zincdiethyl dithiocarbamate The mixing of this compound required the following timing:

At 0 minutes: smoked sheet and peptizer
At 4 minutes: zinc oxide, stearic acid, phenylbetanaphtylamine
At 5 minutes: 1/2 of the carbon blacks
At 6 minutes: remainder of the carbon blacks and process oil
At 8 minutes: sulfur and accelerators
At 9 minutes: dumped

TENSILE (ASTM D412) 3000 LBS.

EXAMPLE NO. 12

To the above production formula were added 1.7 parts of Compound F (described above) and the peptizer omitted. The mixing could then be done as follows:

At 0 minutes: smoked sheet, Compound F
At 4 minutes: all other ingredients except accelerators
At 5½ minutes: accelerators
At 6½ minutes: dumped

TENSILE (ASTM D412) 3090 LBS.

EXAMPLE NO. 13

The following formulations were prepared:

| Components, pts by wt. | Formulation No. | | |
|---|---|---|---|
| | 1 | 2 | 3 |
| Oleic acid | 10 | 10 | 10 |
| Zinc oxide | 1 | 1 | 1 |
| Cetyl alcohol, techn. | 4 | 4 | 4 |
| Petrolatum, N.F. | 40 | 40 | 40 |
| Stearic acid, techn. | 20 | 20 | 20 |
| Potassium hydroxide, 45% | 2 | 2 | 2 |
| Mono(nonylphenoxy)tetra-ethyleneglycol ether | 17 | 17 | 17 |
| Tripropylene glycol | 8 | 8 | 8 |
| Diphenyl phthalate | — | 10 | 8 |
| Dipropyleneglycol dibenzoate | — | — | 2 |

Each of these compositions were employed at the same level in a 250-pound steam hose formulation based upon ethylene-propylene terpolymer rubber (EPT) employing upside down mixing techniques at a 4½ minute mix cycle with the following results:

| Property | Composition No. | | |
|---|---|---|---|
| | 1 | 2 | 3 |
| Mixing time, min. | 4½ | 4 | 3 |
| Dump Temperature, °F. | 240 | 230 | 220 |

In addition, composition No. 1 afforded no improvement in the viscosity, flow or dispersion of the EPT formulation during mixing, while both compositions Nos. 2 and 3, illustrative of the compositions of this application, improved viscosity, flow and dispersion during mixing.

In summary, the foregoing examples illustrate that the compositions materially reduce the viscosity of the rubber during compounding. As a result, excellent mixing of the compound ingredients with rubber can be achieved with less power consumption, in less time and at shorter times than when such compositions are not employed. Further, this is achieved without adverse effect on the physical properties of the cured rubber.

Results such as this cannot be achieved with the compositions of my prior patent, U.S. Pat. No. 3,437,621. The mill release agents of that patent do not appreciably reduce mix times and do not eliminate the need for masticating to avoid scorching of the rubber. Further, the compounds of this invention promote improved dispersion of the compound ingredients in the rubber. For example, improved dispersion of the accelerators and curing agents is achieved, resulting in an increased cure rate or, if the same cure rate is desired, enabling the use of lesser amounts of accelerators.

Having thus provided a written description of the present invention and provided specific descriptions thereof, it should be understood that no undue restrictions or limitations are to be imposed by reason thereof but that the present invention is defined by the attendant claims.

I claim:

1. A composition comprising:
   a. From about 5 percent to about 15 percent of aromatic esters selected from the group consisting of (1) di-aryl- and di-arylalkyl phthalates; (2) di-aryl- and arylalkyl mono-glycolether phthalates; (3) phthalates from polyglycol monoethers of aryl and arylalkyl compounds wherein the polyglycol chain contains from 2 to 6 ethylene oxide groups in the chain; (4) di-benzoates of glycol, and propyleneglycol, and their di- and trimers; and (5) mixtures of the above,
   b. From about 5 % to about 30 % of compounds with alcoholic or glycolic hydroxyl groups selected from the group consisitng of (1) straight or branched chain aliphatic alcohols having from about 8 to 20 carbons in the chain; (2) alkyl-phenoxy ethers of glycols or polyglycols wherein the alkyl group is limited to about 12 carbons in the chain, and the polyglycol grouping does not contain more than about 6 ($CH_2$—$CH_2$—O—) groups: (3) polypropylene glycol of approximately three propylene oxide groups in the molecule; and (4) mixtures of the above,
   c. From about 5% to about 15% of potassium or sodium soaps made from commercial mixtures of fats or fatty acids containing from about 12 to about 18 carbons in the chain, said chains having only a small degree of unsaturation with more than 50% of them having 18 carbons in the chain,
   d. From about 10% to about 30% of fatty acids having from about 12 to about 18 carbon atoms in the chain, said chains having only a small degree of unsaturation, with more than 50% of them having 18 carbon atoms in the chain,
   e. From about 5% to about 10% of a metal soap where the metal is selected from the group consisting of zinc, magnesium, calcium or barium, and the fatty acid part of the soap has from about 12 to 18 carbon atoms in the chain and contains a high percentage of chains with a single double bond in the chain,
   f. From about 15% to about 60% of hydrocarbons selected from the group consisting of mineral oil, mineral waxes, and petrolatum, or mixtures of them.

2. A composition according to claim 1 wherein said potassium or sodium soaps and said fatty acids have iodine values in the range of about 5 to about 15.

3. A composition according to claim 1 wherein the fatty acid part of said metal soap has iodine values in the range of about 80 to about 95.

4. A composition according to claim 1 comprising dipropyleneglycol dibenzoate, nonylphenoxytetraethyleneglycol, tripropylene glycol, potassium soap of hydrogenated tallow, stearic acid, zinc oleate, and petrolatum.

5. A composition according to claim 1 comprising dinonylphenoxy glycol phthalate and dinonylphenoxydiglycol phthalate, cetyl alcohol, nonylphenoxyglycol and nonylphenoxydiglycol, dodecylphenoxy hexaethyleneglycol, sodium stearate, stearic acid, calcium oleate, paraffinic mineral oil and paraffin wax.

6. A composition according to claim 1 comprising benzyldodecylphenoxy hexaethyleneglycol phthalate, 2-ethylhexanol, cetyl alcohol, dodecylphenoxy hexaethyleneglycol, nonylphenoxy tetraethyleneglycol, potassium stearate, stearic acid, barium oleate, magnesium oleate, and petrolatum.

7. A composition according to claim 1 comprising diphenyl phthalate, dipropyleneglycol dibenzoate, cetyl alcohol, tripropylene glycol, potassium stearate, stearic acid, zinc oleate and petrolatum.

8. A composition according to claim 1 comprising diphenyl phthalate, cetyl alcohol, potassium stearate, stearic acid, zinc stearate and petrolatum.

9. A composition according to claim 1 comprising diphenyl phthalate, cetyl alcohol, nonylphenoxytetraethyleneglycol, and tripropylene glycol, potassium soap of hydrogenated tallow, stearic acid, zinc oleate and petrolatum.

10. A composition according to claim 1 comprising of 5–15 percent dipropyleneglycol dibenzoate, about 3–20 percent nonylphenoxytetraethyleneglycol, about 2–10 percent tripropyleneglycol, about 5–15 percent potassium stearate, about 10–30 percent stearic acid, about 5–10 percent oleate, about 15–60 percent petrolatum.

11. A rubber composition comprising a rubber base, carbon black, and a small but effective amount of a composition comprising:
   a. From about 5% to about 15% of aromatic esters selected from the group consisting of (1) di-aryl- and di-arylalkyl phthalates, (2) di-aryl- and arylalkyl mono-glycolether phthalates, (3) phthalates from polyglycol monoethers of aryl and arylalkyl compounds wherein the polyglycol chain contains from 2 to 6 ethylene oxide groups in the chain, (4) di-benzoates of glycol and propyleneglycol, and their di- and trimers, and (5) mixtures of the above,
   b. From about 5% to about 30% of compounds with alcoholic or glycolic hydroxyl groups selected from the group consisting of (1) straight or branched chain aliphatic alcohols having from about 8 to 20 carbons in the chain, (2) alkyl-phenoxy ethers of glycols or polyglycols wherein the alkyl group is limited to about 12 carbons in the chain, and the polyglycol grouping does not contain more than about 6 ($CH_2$—$CH_2$—O—) groups, (3) polypropylene glycol of approximately three propylene oxide groups in the molecule, and (4) mixtures of the above,
   c. From about 5% to about 15% of potassium or sodium soaps made from commerical mixtures of fats or fatty acids containing from about 12 to about 18 carbons in the chain, said chains having only a small degree of unsaturation with more than 50% of them having 18 carbons in the chain,
   d. From about 10% to about 30% of fatty acids having from about 12 to about 18 carbon atoms in the chain, said chains having only a small degree of unsaturation, with more than 50% of them having 18 carbon atoms in the chain,
   e. From about 5% to about 10% of a metal soap where the metal is selected from the group consisting of zinc, magnesium, calcium, or barium, and the fatty acid part of the soap has from about 12 to 18 carbons in the chain and contains a high percentage of chains with a single double bond in the chain,
   f. From about 15% to about 60% of hydrocarbons selected from the group consisting of mineral oil, mineral waxes, and petrolatum, or mixtures of them.

12. A rubber composition according to claim 11 wherein said small but effective amount is about 0.5 to about 3% by weight.

13. An improved method for forming a rubber compound by mixing a rubber base with other compounding ingredients, wherein the improvement comprises adding to said rubber at the beginning of said compounding method a composition according to claim 1, the amount of said composition being sufficient to reduce the time required to achieve mixing of the rubber compound.

14. A method according to claim 13 wherein said amount is from about 0.5 to about 3 percent based upon the total weight of said compound.

15. A method according to claim 13 wherein other compounding ingredients are added to the rubber simultaneously with said composition.

* * * * *

UNITED STATES PATENT OFFICE
CERTIFICATE OF CORRECTION

Patent No. 3,855,165          Dated Dec. 17, 1074

Inventor(s) Erwin Aron

It is certified that error appears in the above-identified patent and that said Letters Patent are hereby corrected as shown below:

Column 5, line 57, Example No. 1, after "minutes" insert --mixing--

Column 9, line 16 change "were" to --was--

Column 11, claim 10, line 7, change "of" to --about--

Column 11, claim 10, line 11, after "percent" insert --zinc--

Signed and sealed this 18th day of February 1975.

(SEAL)
Attest:

RUTH C. MASON
Attesting Officer

C. MARSHALL DANN
Commissioner of Patents
and Trademarks